United States Patent
Li (10) Patent No.: US 9,106,915 B2
(45) Date of Patent: Aug. 11, 2015

(54) VIDEO CODING AND DECODING DEVICES AND METHODS AND SYSTEMS THEREOF

(75) Inventor: Dong Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 2066 days.

(21) Appl. No.: 11/754,035

(22) Filed: May 25, 2007

(65) Prior Publication Data

US 2008/0037635 A1 Feb. 14, 2008

(30) Foreign Application Priority Data

May 25, 2006 (CN) .......................... 2006 1 0011988

(51) Int. Cl.
- *H04N 7/12* (2006.01)
- *H04N 19/174* (2014.01)
- *H04N 19/176* (2014.01)
- *H04N 19/102* (2014.01)
- *H04N 19/61* (2014.01)
- *H04N 19/137* (2014.01)

(52) U.S. Cl.
CPC ........... *H04N 19/174* (2014.11); *H04N 19/102* (2014.11); *H04N 19/137* (2014.11); *H04N 19/176* (2014.11); *H04N 19/61* (2014.11)

(58) Field of Classification Search
CPC ........... H04N 19/00; H04N 19/00012; H04N 19/00127; H04N 19/00145; H04N 19/00175; H04N 19/00781; H04N 19/0012; H04N 19/00272; H04N 19/00178
USPC .............................................. 375/240.1, 240
See application file for complete search history.

(56) References Cited

U.S. PATENT DOCUMENTS

| 5,247,363 A | 9/1993 | Sun et al. |
| 5,594,504 A * | 1/1997 | Ebrahimi ................. 375/240.16 |
| 5,929,940 A * | 7/1999 | Jeannin ......................... 348/699 |

(Continued)

FOREIGN PATENT DOCUMENTS

| CN | 1456016 A | 11/2003 |
| CN | 1665299 A | 9/2005 |

(Continued)

OTHER PUBLICATIONS

A Low Complexity Rate-Distortion Source Modeling Framework, IEEE, Chang et al, May 14-19, 2006.*

(Continued)

*Primary Examiner* — Luu Pham
*Assistant Examiner* — Jahangir Kabir (57) ABSTRACT

Disclosed are Video coding and decoding devices, methods and system thereof, in which the video coding device comprises a video coder for performing video coding on a frame including a plurality of macroblocks by a predefined coding technique so as to output a normal coded stream and for outputting a prediction error value for each of the macroblocks obtained through inter-frame movement prediction, a grading means for grading the macroblocks based on the prediction error values and allocating redundant bit to macroblocks at respective grades, a redundant coder for generating redundant information indicated by corresponding redundant bit for each of the graded macroblock, and a merger means for merging said normal coded stream and said redundant information to generate a final coded stream. With the configuration of the present invention, bit rate will not be increased significantly with content transmission quality being guaranteed.

28 Claims, 6 Drawing Sheets

(56) References Cited

U.S. PATENT DOCUMENTS

| | | | |
|---|---|---|---|
| 6,084,908 A | * | 7/2000 | Chiang et al. ............ 375/240.03 |
| 7,957,604 B2 | * | 6/2011 | Suzuki et al. ................. 382/236 |
| 2002/0176025 A1 | * | 11/2002 | Kim et al. ..................... 348/699 |
| 2008/0219571 A1 | | 9/2008 | Suzuki et al. |

FOREIGN PATENT DOCUMENTS

| | | |
|---|---|---|
| JP | 5-103214 A | 4/1993 |
| JP | 6-070306 A | 3/1994 |
| JP | 6-225153 A | 8/1994 |
| JP | 9116759 A | 5/1997 |
| JP | 2001-045475 A | 2/2001 |
| JP | 2005-295505 A | 10/2005 |
| WO | WO 2005088976 A1 * | 9/2005 |

OTHER PUBLICATIONS

APIC: Adaptive Perceptual Image Coding Based on Subband Decomposition With Locally Adaptive Perceptual Weighting, IEEE, Hontsch et al, 1997.*

* cited by examiner

VIDEO CODING AND DECODING DEVICES AND METHODS AND SYSTEMS THEREOF

BACKGROUND OF THE INVENTION

1. Field of the Invention

The present invention relates to a field of video transmission, such as videophone conference system, and more particularly to a video coding device, a video decoding device, a video coding method, a video decoding method and a system thereof, which divide and hierarchically encode various video contents according to predefined criteria and then transmit them so as to ensure QoS for the transmitted video contents.

2. Description of Prior Art

In an IP-based network environment, it is difficult to effectively guarantee the video transmission quality for video conference thanks to unreliability of network transmission. Well-known methods generally adopt retransmission mechanism or add redundant information. Retransmission, however, usually increases the load on network, and in the case of adding redundant information, since video itself has a great amount of data, it is required that more redundant information has to be added to achieve more reliable guarantee for transmission quality.

At present, various video coding and decoding algorithms have been proposed, for example, Main Profile in H.264 provides a Redundant Slices technique. This technique, however, applies a same method for adding redundant information to any content information, and thus cannot effectively provide corresponding protections for different video contents. Therefore, QoS for video content cannot be guaranteed in the case of a bad network quality.

SUMMARY OF THE INVENTION

The present invention is made in view of the above problems in the prior art. An object of the present invention is to provide a video coding device, a video decoding device, a video coding method, a video decoding method and a system thereof, which divide and hierarchically encode different video contents according to predefined criteria and then transmit them so as to ensure QoS for the transmitted video contents.

According to a first aspect of the invention, a coding device is provided, which comprises a video coder for performing video coding on a frame including a plurality of macroblocks by a predefined coding technique so as to output a normal coded stream and for outputting a prediction error value for each of the macroblocks obtained through inter-frame movement prediction, a grading means for grading the macroblocks based on the prediction error values and allocating redundant bits to macroblocks at respective grades, a redundant coder for generating redundant information indicated by corresponding redundant bits for each of the graded macroblock, and a merger means for merging said normal coded stream and said redundant information to generate a resulting coded stream.

According to an embodiment of the present invention, said grading means dynamically determines the number and method for grading based on at least one of coded bit rate requirement and prediction error value for an actual video frame.

According to an embodiment of the present invention, said grading means classifies to one and same grade the macroblocks for which the prediction error values are similar to each other, and executes the grading in an increment or decrement order of the prediction error values.

According to an embodiment of the present invention, the number of redundant bits allocated to a macroblock belonging to a grade of a greater prediction error value by said grading means is greater than that to a macroblock belonging to a grade of a smaller prediction error value.

According to an embodiment of the present invention, said redundant coder allocates redundant bits to the macroblocks at respective grades based on a predefined bit rate, and the number of the redundant bit can be zero.

According to an embodiment of the present invention, said redundant information includes at least one of a low-precision original image, a low-precision original image and check code, a low-precision prediction error value as well as a low-precision prediction error value and check code.

According to an embodiment of the present invention, said predefined coding technique is one of H.264, H.263, MPEG2 and MPEG4.

According to another aspect of the present invention, a decoding device is provided, which comprises a split means for splitting a coded stream received via a channel into a normal stream and a redundant stream, a video decoder for decoding said normal stream by a predefined decoding technique, a redundant decoder for acquiring a corresponding substitute stream from said redundant stream in the case of an error occurring in the decoded normal stream, and an error masking means for replacing an erroneous portion in the decoded normal stream with said substitute stream.

According to an embodiment of the present invention, said redundant stream includes redundant code.

According to an embodiment of the present invention, said redundant stream includes redundant code and check code.

According to an embodiment of the present invention, said redundant code includes at least one of a low-precision original image and a low-precision prediction error value.

According to an embodiment of the present invention, said predefined coding technique is one of H.264, H.263, MPEG2 and MPEG4.

According to an embodiment of the present invention, when an error occurs in the stream, if there is redundant information at the same grade as a macroblock, said error masking means substitutes the stream for the corresponding macroblock with decoded redundant information.

According to an embodiment of the present invention, when an error occurs in the stream, if there isn't redundant information at the same grade as a macroblock, said error masking means acquires the stream for the corresponding macroblock in a previous frame from a buffer area as said substitute stream.

According to still another aspect of the present invention, a coding method is provided, which comprise the steps of performing video coding on a frame including a plurality of macroblocks by a predefined coding technique so as to output a normal coded stream, and simultaneously outputting a prediction error value for each of the macroblocks through inter-frame movement prediction; grading the macroblocks based on the prediction error values, and allocating redundant bits to macroblocks at respective grades; generating redundant information indicated by corresponding redundant bit for the graded macroblocks; and merging said normal coded stream and said redundant information to generate a resulting coded stream.

According to an embodiment of the present invention, the macroblocks for which the inter-frame prediction error values are similar to each other are classified to one and same grade, the grading is executed in an increment or decrement order of the prediction error values.

According to an embodiment of the present invention, the number of redundant bits allocated to a macroblock belonging to a grade of a greater prediction error value is greater than that to a macroblock belonging to a grade of a smaller prediction error value.

According to an embodiment of the present invention, the number and method for grading are dynamically determined based on at least one of coded bit rate requirement and prediction error value for an actual video frame.

According to still another aspect of the present invention, a decoding method is provided, which comprise steps of splitting a coded stream received via a channel into a normal stream and a redundant stream; decoding said normal stream by a predefined decoding technique; acquiring a corresponding substitute stream from said redundant stream in the case of an error occurring in the decoded normal stream; and replacing an erroneous portion in the decoded normal stream with said substitute stream.

According to an embodiment of the present invention, when an error occurs in the stream, if there is redundant information at the same grade as a macroblock, said method further comprises a step of substituting the stream for the corresponding macroblock with decoded redundant information.

According to an embodiment of the present invention, when an error occurs in the stream, if there isn't redundant information at the same grade as a macroblock, said method further comprises a step of acquiring the stream for the corresponding macroblock in a previous frame from a buffer area as said substitute stream.

Furthermore, there is provided a system comprising said coding device and said decoding device.

With the configuration of the present invention, bit rate will not be increased significantly with content transmission quality being guaranteed.

DETAILED DESCRIPTION OF THE PREFERRED EMBODIMENTS

Hereafter, an embodiment of the present invention will be described in detail with reference to the drawings.

Figure 1:
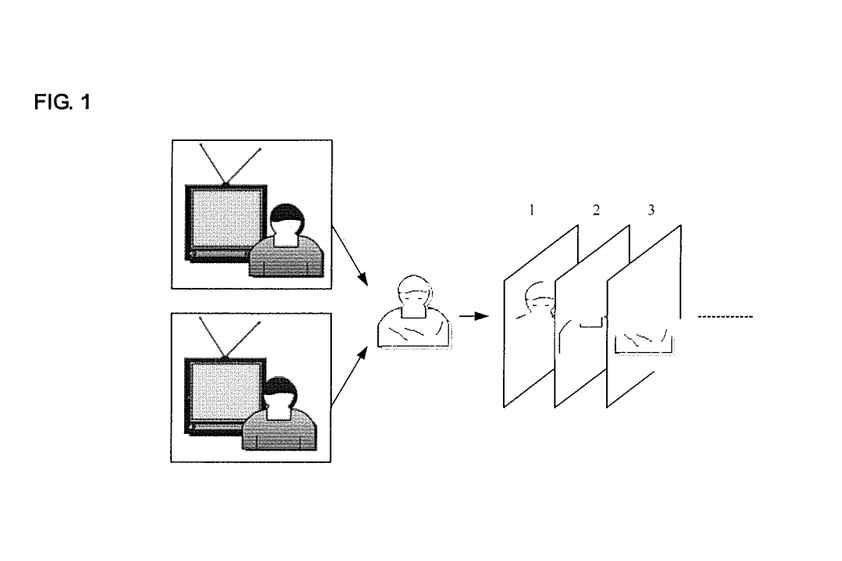
FIG. 1 shows a schematic diagram for explaining how to grade macroblocks in a video frame based on bit plane.
Figure 2A:
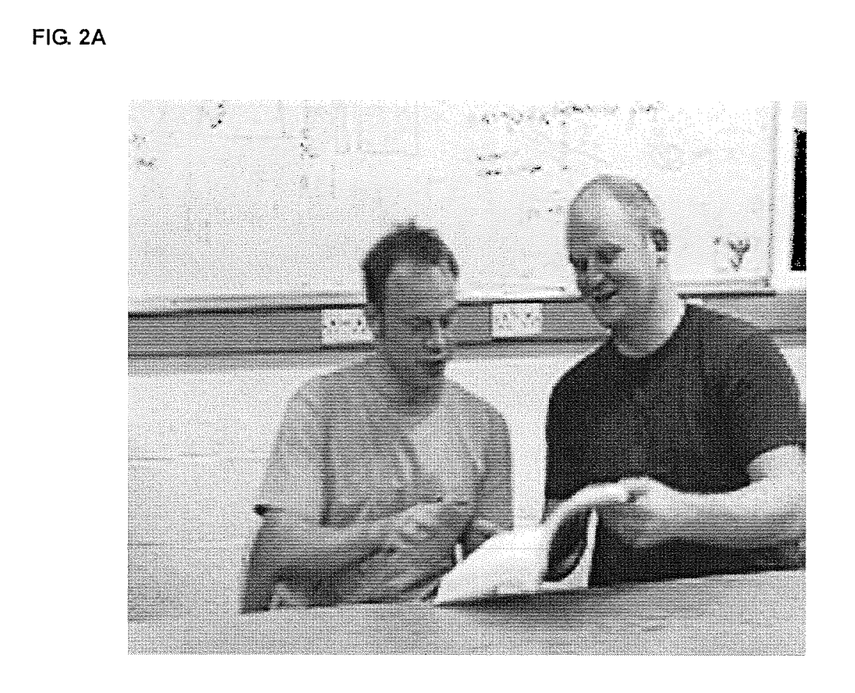
FIG. 2 shows a schematic diagram for explaining the process of macroblock grading.
Figure 2B:
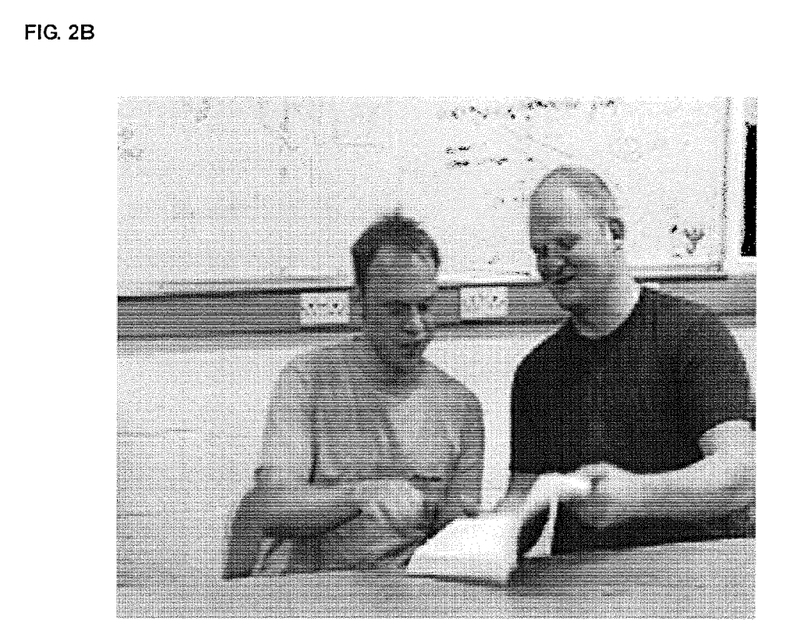
Figure 2C:
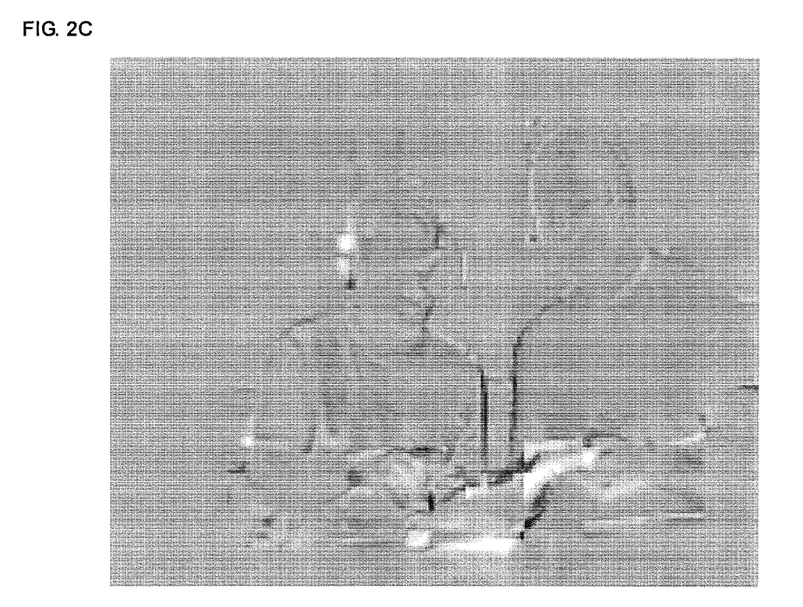
Figure 2D:
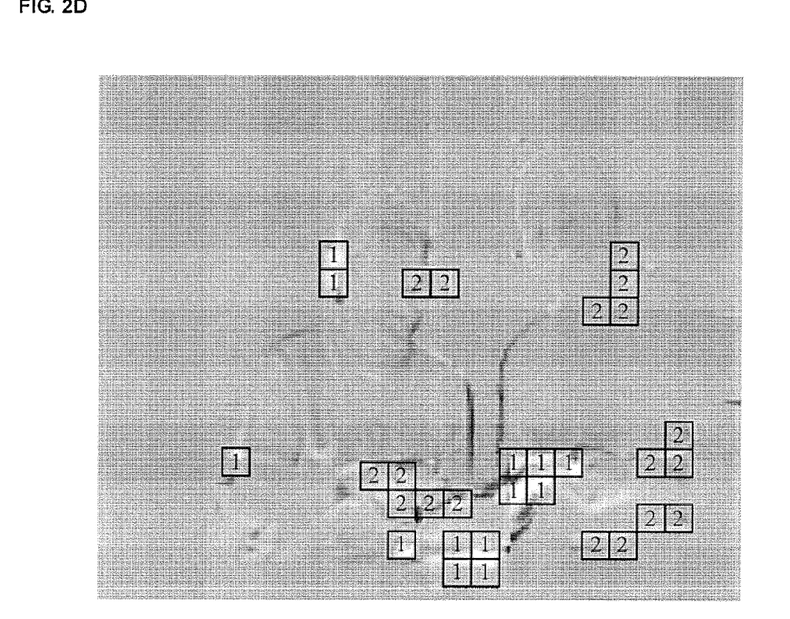

FIG. 1 shows a schematic diagram for explaining how to grade macroblocks in a video frame based on bit plane.

As shown in FIG. 1, a current frame is predicted with respect to a previous frame of a picture. Then video macroblocks are graded in a similar manner to bit plane based on the magnitude of each prediction error value. All the macroblocks with the largest prediction error value are mapped to slice 1, all the macroblocks with smaller prediction error value are mapped to slice 2 and so on, and the number of slices is determined as required.

FIG. 2 shows a schematic diagram for explaining the process of macroblock grading. In FIG. 2, (A) denotes a frame neighboring to a frame denoted by (B), and (C) represents a difference image between a frame predicted with respect to (A) and (B), that is, a prediction difference image. The diagram (D) in FIG. 2 shows slices to which different macroblocks in the prediction difference image are mapped, and ① and ② in FIG. 2 represent slice 1 and 2, respectively. Other macroblocks can be coded in a manner identical to normal coding, for those macroblocks with larger prediction errors, however, redundant information will be allocated to ensure transmission quality of video content.

Therefore, in addition to normally-coded bits, redundant bits are allocated to different slices at coding end, and the redundant information can be but not limited to a low-precision original image plus check code or a low-precision prediction error value plus check code. It is obvious that check code is not necessary here.

Figure 3:
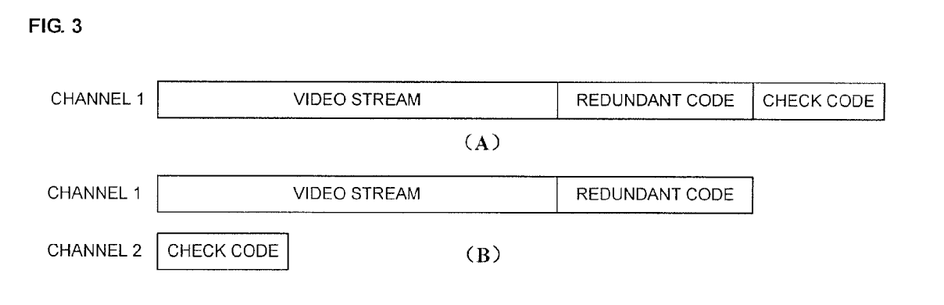
FIG. 3 shows stream content and transmission mode used in the present invention.

The number of the redundant bits allocated to slice 1 is the largest, and that allocated to slice 2 is smaller, and in this way, the number decreases one by one. Accordingly, for those video content with larger movement prediction errors, it is allowed to add more redundant bits so that a better error masking processing can be ensured at decoding side if a transmission error occurs. By allocating a smaller number of redundant bits to those video content with less movement prediction errors, it can be ensured that the stream is controllable as a whole, and if a transmission error occurs, since the prediction error is small, even there is no redundant bit for error masking, compensation can be made directly using a reference image without any serious deterioration in quality. In an actual implementation, as shown in FIGS. 3(A) and (B) respectively, redundant code and check code can be transmitted via a same channel or separated from each other so as to transmit the check code via a reliable channel and the normal stream and the redundant code via another channel.

Furthermore, in the above grading process, the actual number of grades and the used method are determined dynamically based on the actual bit rate requirement and video content. Generally speaking, the finer and more the grades are, the more redundant bits need to be allocated, and the larger the movement prediction error between video frames is, the more redundant information is needed. Thus, a higher bit rate allows more and finer grades to protect more macroblock data, while a lower bit rate allows allocating only fewer grades for protection. Similarly, a larger overall inter-frame prediction error requires more grades, while a smaller overall inter-frame prediction error can be protected with fewer or even no grade. This above process is a dynamic equilibrium process.

Figure 4:
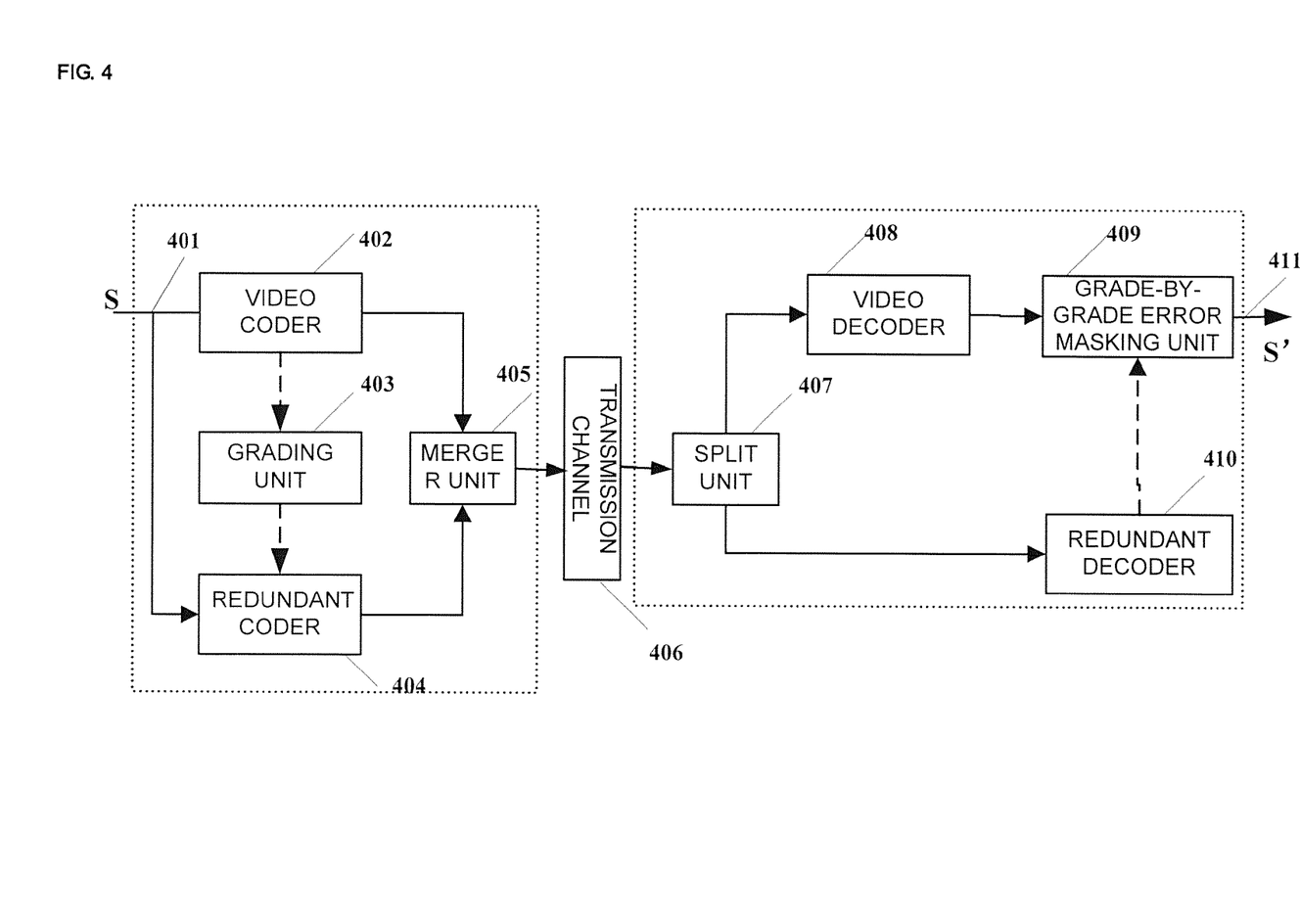
FIG. 4 is a functional block diagram of a video transmission system according to an embodiment of the present invention.

FIG. 4 is a functional block diagram of a video transmission system according to an embodiment of the present invention.

As shown in FIG. 4, a video transmission system according to an embodiment of the present invention includes a video coder 402, a grading unit 403, a redundant coding unit 404 and a merger unit 405.

An original video stream is inputted at the input terminal 401 of the coding device. The input video stream enters the video coder 402, which generates a coded stream by a normal coding on the original video stream and sends to the grading unit 403 bit rate control information as well as movement prediction value between video frames obtained through movement prediction.

The grading unit 403, on one hand, classifies video macroblocks to different protection grades, i.e. different slices, based on the magnitude of the movement prediction value for each of the video macroblocks, and on the other hand, it determines the number of redundant bits for each grade based on the bit rate control information. For example, with a bit rate of 1 Mbps, 8 bits are allocated to the macroblocks classified to slice 1, 4 bits to slice 2 and 1 bit to slice 3; and with a bit rate of 2 Mbps, 16 bits are allocated to the macroblocks classified to slice 1, 8 bits to slice 2 and 2 bit to slice 3.

The redundant coder 404 generates different redundant information for macroblocks of different grades based on the input original stream and the grade information and the redundant bit number for each macroblocks generated by the grading unit 403. As previously described, the redundant information for each macroblock can be but not limited to its low-precision original image plus check code or its low-precision prediction error value plus check code. Also as described above, the check code is not necessary. Packet check code can be selected if check code is used.

Then, the merger unit 405 merges the normal stream produced by the video coder 402 and the redundant information produced by the redundant coder 404 into one same video stream and sends it out via a transmission channel 406.

As shown in FIG. 4, a decoding device in the video transmission system of the present invention includes a split unit 407, a video decoder 408, a redundant decoder 410 and a grade-by-grade error masking unit 409.

The split unit 407 receives a stream transmitted over an IP network or a wireless network via the transmission channel 406 and splits the received stream into a normal stream and a redundant stream. Here, the normal stream is a stream which has no addition of redundant information and is generated through a standard coding process, such as H.264, H.263, MPEG2 or MPEG4, while the redundant stream is a stream of the redundant information added on the basis of the above method and grade.

The split unit 407 transfers the split normal stream to the video decoder 408 and on the other hand, transfers the redundant stream to the redundant decoder 410. The video decoder 408 then generates normal decoded information from the normal stream and sends to the redundant decoder 410 error information, that is, information about a macroblock suffering from an error, if some error or missing occurs in the stream.

The redundant decoder 410 first judges whether a redundant code for the error-inflicted macroblock exists in the redundant stream. If there is no redundant code for the macroblock, the stream of a corresponding macroblock in a previous frame is extracted from a buffer area for decoding and used as the last-outputted stream of the macroblock in the current frame.

If there is redundant code for the macroblock, the check code is utilized to check the redundant code for the macroblock so that it can be judged whether the redundant code is proper. If the redundant code is proper, a substitute stream for the error-inflicted macroblock is generated from the redundant code and then outputted to the grade-by-grade error masking unit 409, in which the stream of the error-inflicted macroblock is replaced with the substitute stream, and then a final decoded video stream is outputted after the error masking.

If the above redundant code is improper, the check code is utilized to recover the redundant code, and then the process is carried out as described above. The decoded video frame is outputted at the output terminal 411 for the decoding device.

Figure 5A:
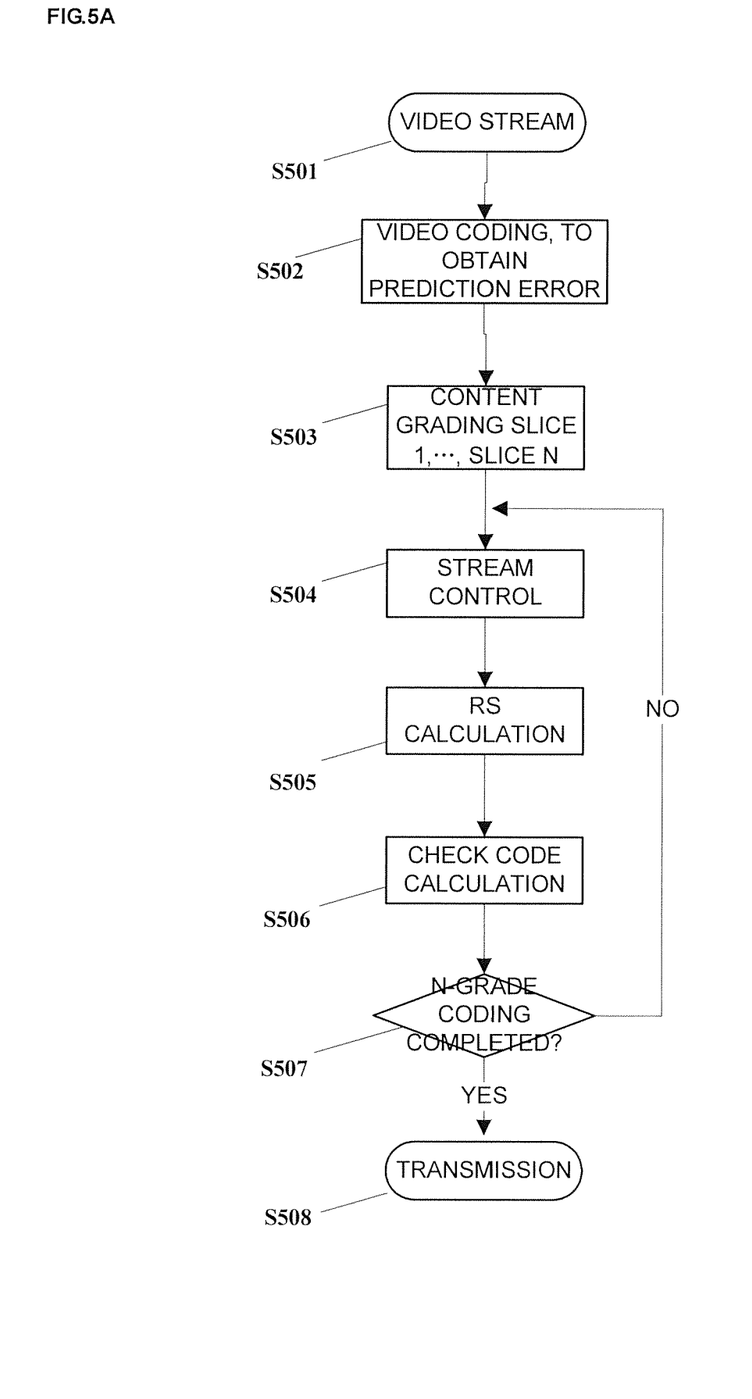
FIG. 5A is a flowchart for a video coding method according to an embodiment of the present invention.

FIG. 5A is a flowchart for a video coding method according to an embodiment of the present invention. As shown in FIG. 5A, an original video stream S is acquired or inputted from a video source in Step S501. Next, in Step S502, a normal coding processing is performed on the input original video stream according to predefined coding technique, such as H.264, H.263, MEPG2 or MPEG4, and a movement prediction value for each video macroblock is obtained through inter-frame movement prediction and then outputted. Thereafter, a prediction error is determined as the difference between the inter-frame movement prediction value for each macroblock and its actual value.

In Step S503, each of the video frames is divided into different protection grades based on the magnitudes of prediction errors for different macroblocks, with the macroblocks being classified into different protection grades slice 1, slice 2, . . . , slice N.

In Step S504, the number of redundant bits for each grade is determined on the basis of bit rate control information. For example, with a bit rate of 1 Mbps, 8 bits are allocated to the macroblocks classified to slice 1, 4 bits to slice 2 and 1 bit to slice 3; and with a bit rate of 2 Mbps, 16 bits are allocated to the macroblocks classified to slice 1, 8 bits to slice 2 and 2 bit to slice 3.

In Steps S505 and S506, different redundant information is generated for the graded microblocks based on the grading result and the bit allocation scheme. For example, the redundant information for each macroblock can be but not limited to its low-precision original image plus check code or its low-precision prediction error value plus check code. Here, error correction code, such as packet check code, can be selected as the check code. As described above, the robustness of the system will be enhanced if check code is included in the redundant information.

In Step S507, it is judged, for each macroblock at each grade, whether the code and its redundant information have been obtained, and if the answer is negative, the flow returns to Step S504 and the above action is repeated. If the process of N-grade coding has been completed, the code plus redundancy is transferred sequentially in Step S408 until the code transmission has been fulfilled for all the protection grades.

Figure 5B:
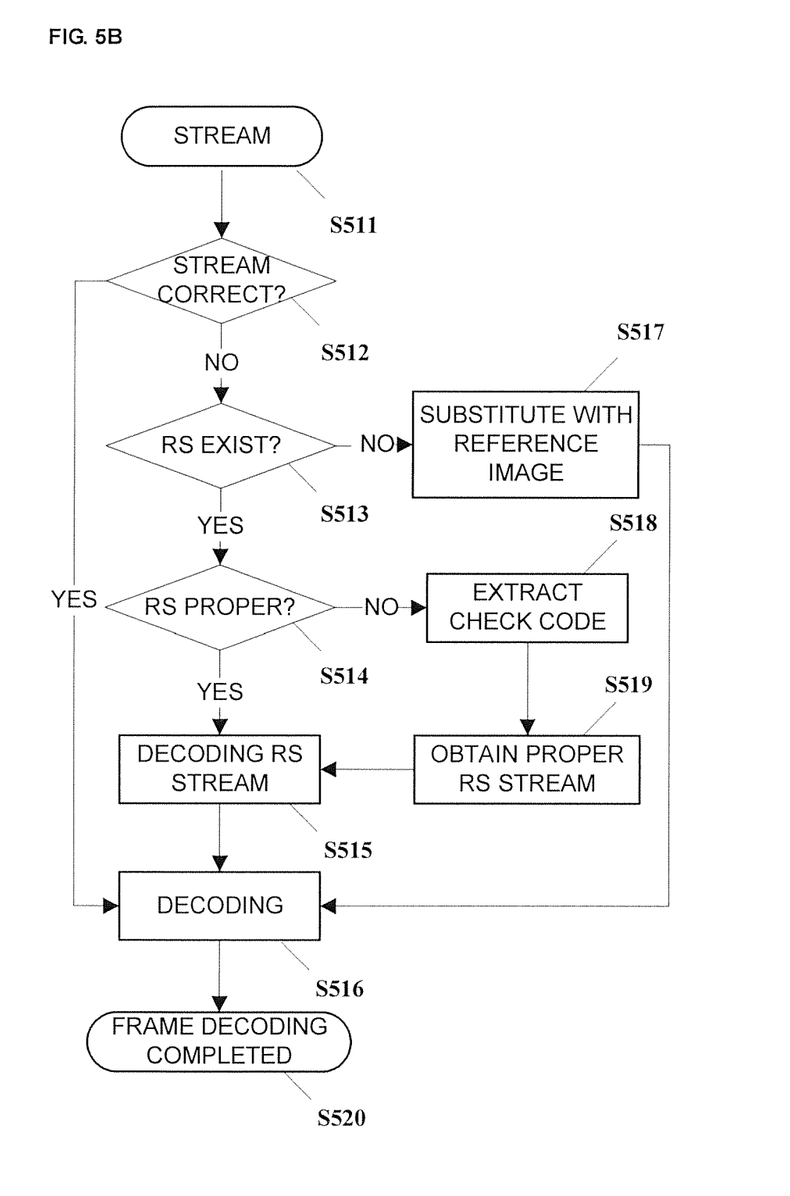
FIG. 5B is a flowchart for a video decoding method according to an embodiment of the present invention.

FIG. 5B is a flowchart for a video decoding method according to an embodiment of the present invention. As shown in FIG. 5B, a stream is received via a transmission channel in Step S511. Next, it is judged whether the received stream of a current frame is correct in Step S512, and if it is correct, the flow proceeds directly to Step S516, and a decoding process is performed on the coded stream of the current frame in an order reverse to that at coding side.

On the other hand, if some error occurs in part of the stream of the current frame, that is, some decoding error happens to one of the macroblocks, it is judged whether redundant code for the macroblock exists in the stream in Step S513.

If there is no redundant code for the macroblock in the stream, a corresponding macroblock in a previous decoded frame is extracted from a buffer area and used as the decoded result of the above macroblock. The flow then proceeds to Step S516 and continues the subsequent decoding.

If there is redundant code for the macroblock in the stream, it is judged whether the redundant code is proper in Step S514. If it is improper, a corresponding check code is acquired in Step S518, and thereafter, in Step S519, the redundant code is corrected using the check code to obtain a proper redundant code.

Later in Step S515, a substitute stream of the corresponding macroblock is obtained from the proper redundant code, and if the decoding process has been fulfilled for the macroblock at all grades, a decoded stream S' is outputted for the current frame.

Therefore, when compared with the existing error masking methods, the present invention has the two primary advantages as follows. First, the importance degree of video content has been given sufficient consideration so that error recovery can be priorly guaranteed for important content even if some transmission error occurs, thereby preventing remarkable degradation in video quality. Second, since the bit number for the added redundant information depends on different grades, the overall bit rate can be controlled.

The above description is only the preferred embodiment of the present invention, and the scope of the invention is not limited thereto. In the technological range disclosed in the present invention, any variation or substitution readily conceivable by those skilled in the art should be covered by the scope of the invention, which should be defined by the appended claims.

What is claimed is:

1. A coding device, comprising:
    a video coder configured to perform video coding on a frame including a plurality of macroblocks by a predefined coding technique so as to output a normal coded stream and output a prediction error value for each of said macroblocks obtained through inter-frame movement prediction,
    a grading unit configured to grade said macroblocks based on said prediction error values and allocate different number of redundant bits to said macroblocks at respective grades;
    a redundant coder configured to generate corresponding redundant information indicated by said redundant bits for each of the graded macroblock; and
    a merger unit configured to merge said normal coded stream and said redundant information to generate a resulting coded stream;
    said grading unit is further configured to:
    classify to one and same grade the macroblocks for which the prediction error values are similar to each other;
    execute the grading process in an increment or decrement order of the prediction error values;
    dynamically determine the number of redundant bits and method for grading based on at least one of coded bit rate requirement and prediction error value for an actual video frame;
    uses the higher bite rate to allow more and finer grades to protect more macroblock data, wherein a larger overall inter-frame prediction error requires more grades; and
    uses a lower bit rate to allow allocating only fewer grades for protection, wherein a smaller overall inter-frame prediction error is protected with fewer or even no grade.

2. The coding device of claim 1, wherein the number of redundant bits allocated to a macroblock belonging to a grade of a larger prediction error value by said grading unit is greater than that to a macroblock belonging to a grade of a smaller prediction error value.

3. The coding device of claim 1, wherein said redundant coder is further configured to allocate said redundant bits to said macroblocks at respective grades based on a predefined bit rate, and the number of said redundant bit can be zero.

4. The coding device of claim 1, wherein said redundant information includes at least one of a low-precision original image, a low-precision original image and check code, a low-precision prediction error value as well as a low-precision prediction error value and check code.

5. The coding device of claim 1, wherein said predefined coding technique is one of H.264, H.263, MPEG2 and MPEG4.

6. A decoding device, comprising:
    a split unit configured to split a coded stream received via a channel into a normal stream and a redundant stream,
    a video decoder configured to decode said normal stream by a predefined decoding technique,
    a redundant decoder configured to acquire a corresponding substitute stream from said redundant stream in the case of an error occurring in the decoded normal stream, and
    an error masking unit configured to replace an erroneous portion in the decoded normal stream with said substitute stream,
    wherein the redundant stream comprises redundant bits for each of the macroblocks which are graded based on prediction error values, the macroblocks at different grades are allocated different number of redundant bits by a grading unit configured to:
    classify to one and same grade the macroblocks for which the prediction error values are similar to each other;
    execute the grading process in an increment or decrement order of the prediction error values;
    dynamically determine the number of redundant bits and method for grading based on at least one of coded bit rate requirement and prediction error value for an actual video frame;
    uses the higher bite rate to allow more and finer grades to protect more macroblock data, wherein a larger overall inter-frame prediction error requires more grades; and
    uses a lower bit rate to allow allocating only fewer grades for protection, wherein a smaller overall inter-frame prediction error is protected with fewer or even no grade.

7. The decoding device of claim 6, wherein said redundant stream includes redundant code.

8. The decoding device of claim 7, wherein said redundant code includes at least one of a low-precision original image and a low-precision prediction error value.

9. The decoding device of claim 7, wherein said predefined coding technique is one of H.264, H.263, MPEG2 and MPEG4.

10. The decoding device of claim 6, wherein said redundant stream includes redundant code and check code.

11. The decoding device of claim 10, wherein said redundant code includes at least one of a low-precision original image and a low-precision prediction error value.

12. The decoding device of claim 10, wherein said predefined coding technique is one of H.264, H.263, MPEG2 and MPEG4.

13. The decoding device of claim 6, wherein when an error occurs in the stream, if there is redundant information at the same grade as a macroblock, said error masking unit substitutes the stream for the corresponding macroblock with decoded redundant information.

14. The decoding device of claim 6, wherein when an error occurs in the stream, if there isn't redundant information at the same grade as a macroblock, said error masking unit acquires the stream for the corresponding macroblock in a previous frame from a buffer area as said substitute stream.

15. A coding method for a coding device, the coding method comprising the steps of:
    performing, by the coding device, video coding on a frame including a plurality of macroblocks by a predefined coding technique so as to output a normal coded stream, and simultaneously outputting a prediction error value for each of said macroblocks obtained through inter-frame movement prediction;

grading, by the coding device, said macroblocks based on said prediction error values, and allocating different number of redundant bits to said macroblocks at respective grades;

generating, by the coding device, redundant information indicated by corresponding redundant bits for the graded macroblocks; and merging, by the coding device, said normal coded stream and said redundant information to generate a resulting coded stream; and the method further comprising the grading steps of:

classifying to one and same grade the macroblocks for which the prediction error values are similar to each other;

executing the grading process in an increment or decrement order of the prediction error values;

dynamically determining the number of redundant bits and method for grading based on at least one of coded bit rate requirement and prediction error value for an actual video frame;

using the higher bite rate, allowing more and finer grades to protect more macroblock data, wherein a larger overall inter-frame prediction error requires more grades; and using a lower bit rate, allowing allocating only fewer grades for protection, wherein a smaller overall inter-frame prediction error is protected with fewer or even no grade.

16. The coding method of claim 15, wherein the number of redundant bits allocated to a macroblock belonging to a grade of a larger prediction error value is greater than that to a macroblock belonging to a grade of a smaller prediction error value.

17. The coding method of claim 15, wherein said redundant information includes at least one of a low-precision original image, a low-precision original image and check code, a low-precision prediction error value as well as a low-precision prediction error value and check code.

18. The coding method of claim 15, wherein said redundant bits are allocated to said macroblocks at respective grades based on a predefined bit rate, and the number of said redundant bits can be zero.

19. The coding method of claim 15, wherein said predefined coding technique is one of H.264, H.263, MPEG2 and MPEG4.

20. A decoding method for a decoding device, the method comprising the steps of:

splitting, by the decoding device, a coded stream received via a channel into a normal stream and a redundant stream;

decoding, by the decoding device, said normal stream by a predefined decoding technique;

acquiring, by the decoding device, a corresponding substitute stream from said redundant stream in the case of an error occurring in the decoded normal stream; and replacing, by the decoding device, an erroneous portion in the decoded normal stream with said substitute stream;

wherein the redundant stream comprises redundant bits for each of the macroblocks which are graded based on prediction error values, the macroblocks at different grades are allocated different number of redundant bits by performing the grading steps of:

classifying to one and same grade the macroblocks for which the prediction error values are similar to each other;

executing the grading process in an increment or decrement order of the prediction error values;

dynamically determining the number of redundant bits and method for grading based on at least one of coded bit rate requirement and prediction error value for an actual video frame;

using the higher bite rate, allowing more and finer grades to protect more macroblock data, wherein a larger overall inter-frame prediction error requires more grades; and using a lower bit rate, allowing allocating only fewer grades for protection, wherein a smaller overall inter-frame prediction error is protected with fewer or even no grade.

21. The decoding method of claim 20, wherein said redundant stream includes redundant code.

22. The decoding method of claim 21, wherein said redundant code includes at least one of a low-precision original image and a low-precision prediction error value.

23. The decoding method of claim 21, wherein said predefined coding technique is one of H.264, H.263, MPEG2 and MPEG4.

24. The decoding method of claim 20, wherein said redundant stream includes redundant code and check code.

25. The decoding method of claim 24, wherein said redundant code includes at least one of a low-precision original image and a low-precision prediction error value.

26. The decoding method of claim 24, wherein said predefined coding technique is one of H.264, H.263, MPEG2 and MPEG4.

27. The decoding method of claim 20, wherein when an error occurs in the stream, if there is redundant information at the same grade as a macroblock, said method further comprises a step of substituting the stream for the corresponding macroblock with decoded redundant information.

28. The decoding method of claim 20, wherein when an error occurs in the stream, if there isn't redundant information at the same grade as a macroblock, said method further comprises a step of acquiring the stream for the corresponding macroblock in a previous frame from a buffer area as said substitute stream.

* * * * *